United States Patent [19]

Horn

[11] Patent Number: 4,776,193

[45] Date of Patent: Oct. 11, 1988

[54] METHOD FOR MAKING FLANGE HALF SHELLS, AS WELL AS FLANGES FORMED BY TWO FLANGE HALF SHELLS

[75] Inventor: Joachim Horn, Karst, Fed. Rep. of Germany

[73] Assignees: Karl J. Groten; Paul E. Groten, both of Ahaus, Fed. Rep. of Germany

[21] Appl. No.: 895,354

[22] Filed: Aug. 11, 1986

Related U.S. Application Data

[63] Continuation of Ser. No. 786,712, Oct. 11, 1985, Pat. No. 4,660,266, which is a continuation of Ser. No. 523,306, Jul. 14, 1983, abandoned.

[30] Foreign Application Priority Data

Nov. 14, 1981 [DE] Fed. Rep. of Germany ....... 3145261

[51] Int. Cl.[4] .............................................. B21B 15/00
[52] U.S. Cl. ..................................................... 72/203
[58] Field of Search ..................... 72/203, 366; 29/463; 285/412, 415

[56] References Cited

U.S. PATENT DOCUMENTS 2,239,202  4/1941  Rendleman .......................... 428/599

FOREIGN PATENT DOCUMENTS 7766 of 1906 United Kingdom .................. 29/161

Primary Examiner—Lowell A. Larson
Attorney, Agent, or Firm—Michael J. Striker

[57] ABSTRACT

The invention relates to a method of making flange half shells and flanges made therefrom, whereby an optimum arrangement of the flanges should be obtained with respect to their use, for this purpose the flange half shells (1) are held together by means of clamps (2), whereby the clamps (2) engage into associated suitable slots (3) which are provided in the flange half shells (1). Furthermore, the flange half shells are extruded from a strand and therefore obtain a hardness which is adapted to the hardness of the mounting screws.

9 Claims, 1 Drawing Sheet

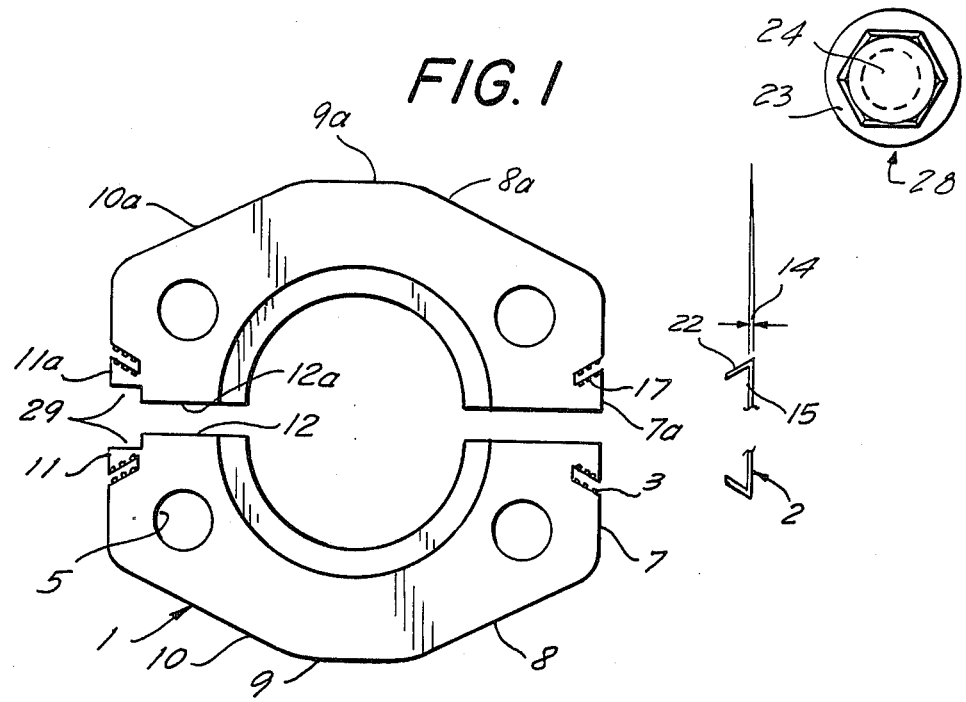
U.S. Patent   Oct. 11, 1988   4,776,193

METHOD FOR MAKING FLANGE HALF SHELLS, AS WELL AS FLANGES FORMED BY TWO FLANGE HALF SHELLS

This is a continuation of application Ser. No. 786,712, filed Oct. 11, 1985, now U.S. Pat. No. 4,660,266 granted Apr. 28, 1987 which in turn is a continuation of application Ser. No. 523,306, filed July 14, 1983, now abandoned.

The invention relates to a method for making flange half shells, as well as flanges formed by two flange half shells.

These are loose flange connections for pipe or hose connections on hydraulic parts, for example, mobile devices, like dredgers, cranes etc., as well as rolling mills and other known devices. Such a flange which comes closest to the invention consists of forged material or malleable cast iron. The mold corresponds to the illustration in accordance with FIGS. 1 and 2, however in view of the required hardness, caused by the manufacturing process between the two screw bores of half a flange (flange half shell), a curved shaped rib is provided which extends to the proximity of the screw threads. Therefore, not sufficient space is left for applying a fixed wrench, so that a tightening can be performed only at small angles, i.e., one has to apply the fixed wrench again and again. Socket wrenches do not find space because the dimension of the screw does not leave any space for the center bore. Furthermore, the rib constitutes an additional waste of material because it corresponds at its highest point to the flange thickness in the screw bore area. Furthermore, it is disadvantageous in the known embodiments that the flange half shells cannot be made in any desired hardness; this is particularly true for the flange half shells made of malleable cast iron. Finally, too much waste is generated and one must operate with a high energy consumption because of the high temperatures and the many aftertreatment steps, respectively. Furthermore, the engagement faces facing each other must be subsequently treated because the cutting thickness of the saw blade is lost at this location if the half shell is made by cutting open a flange which had been extruded as a total unit. As is known, half shells are required because one cannot mount a flange as a total unit onto the bore end or the coupling piece. Finally, a precise positioning with respect to the pinhole image of a pump or hydraulic, for example, is not possible. Therefore, at first, the one half flange must be mounted during assembly and then the second one must be subsequently attached. Thereby, difficulties are already generated, in particular because a precise centering is not possible, since each screw bore will be larger than the screw to be introduced. In other words, the mounted flange is displaced and the supporting faces of the screws with respect to the screw bores are not centrically disposed. When tightening the screws one does not have a uniform force pressure. Since, in addition, the screw material is harder, for example, than the malleable cast iron material or the forged half shells, the screws will loosen because the material of the flange half shells flows due to the high tightening pressure; a continuous subsequent tightening is required.

It is an object of the invention to provide a flange which is shaped from two flange half shells which does not have the aforementioned and later mentioned disadvantages, which, in particular, can be easily mounted, which can be preoriented at the place of use (hose coupling piece, etc.), in such a manner as if it would be a complete (unitary) flange and whereby between the screws and the flange material none or almost no difference is present, so that uniform material characteristics come into engagement with each other during the tightening of the screws. Furthermore, it is also an object of the invention to provide a more cost favorable flange which assures a correct and desired seat after assembly and which also guarantees a uniform face pressure of the tightened screws.

This object of the invention is solved by the characterizing features of claims 1 and 2 and the ones of the subclaims.

In contrast to the aforementioned embodiments which are made by forging or casting, all mentioned disadvantages are removed, in particular the rough surface is eliminated which is present during a casting or forging operation. A higher hardness can be obtained due to the rolling process in adaptation to the screw material. In accordance with the invention an improved support face of the lower side of the screw or the screw disc is obtained because a support face is provided, without any aftertreatments, which corresponds to an aftertreated support face, due to the sawing off operation which does not require any aftertreatments, so that the total surfaces of the half flange are completely even. Finally, the energy requirement is less than during a casting operation and also the 20% loss of material is eliminated. Since after the mounting of the one flange half shell, the second flange half shell is precisely positioned by means of the clamps, so free space is created between the engagement faces of the two flange half shells and the screws are precisely fixed in the screw bores and are supported as intended, thus a uniform face pressure is guaranteed all around in the area of the mounted disc, but even if one uses normal screws without a disc the same advantage is provided, but it is not so favorable.

Flanges of this type are actually used in twelve profiles. In the inventive method of manufacturing the further advantage is obtained that one can use two adjacent profiles (pressure stages) of one type of flange half shell because this is offered due to the precise manufacturing. Hence, one profile covers two dimensions. Furthermore, a cost saving is also created because one does not need twelve different rolling profiles any longer. In view of the precise positioning no "break away" of the half flanges can occur, as was almost always the case with the known flange half shells because they did not have clean connections.

In accordance with today's cost standards, a cost reduction is obtained which is about 50%. More space is now available for tightening when applying the wrench because the rib between the two screw bores is not required any longer, since the material used has the required hardness without the auxilliary means (rib). In addition, no waste is generated in the rolling process, as experience has shown.

Further details of the invention can be seen from the drawing and the description. The drawing shows:

FIG. 1 two flange half shells in a plan view (at a distance spaced apart from each other) which in an assembled manner result in a flange, FIG. 2 a view of a flange half shell, seen from the inside, FIG. 3 a screw with a pressed on disc on a plan view and FIG. 4 a mounted flange.

In accordance with the inventive method a rod or strand is rolled from a drawn, rolled or extruded raw material or raw profile, for examples, a wire bar or a block of steel which has the desired shape and cross sectional face of a flange half shell without screw bores and collar stage. The strand made in accordance with the method may correspond in its outer contours to the arrangement of the outer faces 7 to 11 (or 7 to 11a). Furthermore, a semicircular curve as inner contour is also rolled into the strand during rolling. Thereafter, the flange half shells are shaped in that pieces are cut off from the strand corresponding to the length (height) 13 of flange 1. Subsequently, in an advantageous sequence the screw bores 5, the collar stage 6 and the slots 3 are made. Already when mounting the collar stage 6 one can use the clamps 2 which hold together the two half flanges 1, once the slots 3 were made. The clamps 2 are then inserted either from the side, or from above. So as to obtain a light pressure seat, one can dispose the slots 3 in an oblique manner, so that two adjacent slots 3 of the two half flanges are provided with oblique extending slots 3 which diverge toward each other.

It is also a part of the invention to bend the back of clamp 2 slightly outwardly; if the clamp 2 consists of a yielding elastic material, an additional force is generated which has the tendency to press the engagement faces 12,12a of the half shells 1 against each other.

So that the clamps 2 can be easily detached, it is advantageous, to provide the outer face 7,7a not parallel to the inner face 15 of clamp 2, but rather so that they are not flush but meet in a blunt angle with respect to each other. Thereby, an intermediary space 29 is provided between the inner face 15 and the outer faces 7,7a, so that a tool, for example, a screw driver can be used for removing clamp 2.

It is understandable that, once the clamps 2 are inserted, the two half flanges 1 form a unit as if it would be a unitary flange. The assemblying, in particular the positioned assemblying is then very simple.

In the area, wherein in the known embodiments ribs (also partly described as ears) are provided on the flange half shells, a reinforcement is obtained in the inventive flange, in addition to the more suitable material, because in accordance with the invention the depth 16 is reduced by about 2 to 3 mm. This material reinforcement (the remaining part becomes longer by this amount) acts against the bending stress which occurs at this point. A further advantage is obtained in that the insert, for example, the hose insert 20 protrudes with its cylindrical part 25 by about 2 to 3 mm beyond the contact pressure face 26, thus resulting in an improved sealing, because one can now provide a precise insertion 18—contact pressure face. Furthermore, unnecessary work is eliminated, because in the known embodiments the total face 27, for example, of housing 19 had to be aftertreated. Now it is merely required to aftertreat the contact pressure face 18. In the illustrated example (FIG. 4) one can recognize the sealing ring 21 which however does not play any role in this connection.

In this embodiment a rectangular hole "circle" is chosen.

FIG. 3 shows a screw 28. Screws of this type are principally known, but not in their use with respect to flange half shells. Screw 28 differs from the otherwise used hexagonal or socket head cap screws in that a disc 23 is mounted immediately on the screw head 24, thus assuring a wide engagement face, whereby this disc 23 can have a possibly very large diameter which is also a part of this invention. Such screws always have a smaller wrench width, so that in this area more space is made available.

It is further a part of this invention to eliminate the enlarged recess with the collar step 6. Thus, one obtains a strongly price reduced embodiment of a flange, if one leaves the semicircular bore 4 which constitutes the total length 13 of the half flange. If one assembles two half flanges 1 in this manner, the hose insert 20 would support on the contact pressure face 26, that is, it would protrude by about 5 to 7 mm. However, this would not mean to be an impairment, because this further protrusion can be bridged by longer screws and by means of a deeper recess 18.

It is a further part of the invention that the clamps 2 can be shaped differently; they will then be inserted from above. The inventive clamping has particular advantages when using straight connections, because the important positioning is also made possible.

Similar advantages are the result in sleeve connections; they require four half shells for a maximum design which cannot be assembled without clamping, or one has to use further labor.

The inventive flanges also have the advantage that they can be sawed off at each given thickness (height). In dies this is much more complicated, for example, because for each minor change in length one needs a new die.

The inventive half shells of a flange may be positioned so well because the faces 12,12a are even and flush with respect to the semicircular diameter. The two half shells form a flange wherein the faces 12,12a are flush in engagement with each other and form a throughput which is completely circular in its cross section. In the known half shells, the half shells form a separating slot which causes considerable disadvantages.

When the faces 12,12a are in flush engagement with each other, it results in a defined distance of the screw bores 5. The bores were precisely placed which is assured by the true to size rolled strand, because the faces 12,12a are already rolled in. A piece which had been separated from the rolled strand can be positioned in a bore machine in such a manner that the screw holes 5 can be placed in a precise distance from the faces 12,12a. Thereby, faces 12,12a function like a gauge. The precise setting of the screw holes 5 can be enhanced in an advantageous manner in that preferably in each face 12,12a, a steplike recess 29 can be provided on the outer edge thereof and extending parallel to the holes 5 to be bored, preferably it is rolled in and has to be only a few millimeters deep and long. The particular advantage which results from this steplike recess is obtained during boring of the screw holes 5 when two half shells are are precisely fitted against each other, so that the result is a U-shaped groove from two oppositely steplike recesses. A centering element of a bore machine can move into this groove and can position the flange half shells for boring the screw holes 5, before the clamping jaws of the bore machine clamp the work piece. Thereby, the subsequently bored holes 5 have a precise distance from the given faces 12,12a and naturally also from faces 7. The precise operating can only be performed with accurate to size rolled half shells.

Despite of the disadvantages which are known since decades concerning the flanges in question and the need for improving the quality of the flanges, the rolling of a half shell was heretofore not taken into consideration. Rather, the developments have created much more complicated molds, so as to allegedly solve assembly or harness problems. However, all of these suggestions were not satisfactory. Rolled half shells have so many unexpected advantages that this manner of manufacturing will prevail in the future. Thereby, the technology in the field of the flange manufacturing and use will be suddenly enriched. Material dependent problems which occur, for example, with the forging process because one can only forge steel with relative low hardnesses, are not present in the subject invention, because wire bars or blocks of very hard steel can be rolled with a relative low effort. Differently thick half shells can be cut off from a rolled strand, so that a plurality of flange types can be made from one strand. Thereby, it can be provided to enlarge the semicircular throughput 4 for other flange types, for example, by larger recesses. The enlarging or the reduction of the throughput can be obtained without any great effort in that during the rolling operation the rolling roll is exchanged which rolls the semicircular groove for the throughput 4. Such simple changes cannot be performed with the known methods, wherein totally different tools have to be used. The series of advantageous could be arbitrarily continued. However, the aforementioned statements sufficiently proof that the rolling of a strand with the contours of a flange half shell has extraordinary and many surprising advantages. Thereby, the rolling of a strand was not at all obvious, because one has to saw off individual parts from the strand with great preciseness, that is, one has to choose an additional operating step. However, as a rule, an additional method step prevents a person skilled in the art to consider another method than the known one. A person skilled in the art could not expect the result of so many considerable advantages despite the additional method step.

I claim:

1. A method of making a split-flange connector comprising the steps of:
   (a) working a strand of steel exclusively by rolling into an elongated bar having a planar face formed centrally with a semi-cylindrical groove extending parallel to the face so that final outer and inner peripheral shapes of the bar are formed simultaneously and exclusively by rolling, the bar having a pair of side surfaces extending at an angle of between 164° and 172° to the planar face;
   (b) cutting the rolled bar perpendicularly to the face into at least two identical sections of a predetermined length so as to form the sections of a final shape;
   (c) forming at least one bore offset from and parallel to the groove through each bar section; and
   (d) securing the two rolled and cut sections together with the faces abutting flatly and the grooves forming a cylindrical passage.

2. The method defined in claim 1, further comprising after step (d) the step of
   (e) cutting away one end of the cylindrical passage to form at the one end a substantially cylindrical passage section of larger diameter than the passage and substantially coaxial thereto.

3. The method defined in claim 1, wherein said rolling step includes rolling the strand so as to simultaneously roll laterally projecting formations at the side surfaces, said securing step includes clipping together the sections by fitting clips over the formations of the side surfaces.

4. The method defined in claim 3, wherein said formations are grooves extending parallel to the groove in the planar face and diverging outward away from each other.

5. The method defined in claim 1, wherein the strand is rolled at a temperature of between 1150° C. and 1250° C.

6. The method defined in claim 1, wherein two such bores are drilled through each section symmetrically offset from the groove thereof.

7. A split-flange connector comprising two identical sections produced exclusively by rolling a strand of steel into an elongated bar having a planar face formed centrally with a semi-cylindrical groove extending parallel to the face so that outer and inner peripheral shapes of the bar are formed simultaneously and exclusively by rolling, and subsequent cutting the roller bar perpendicularly to the face into at least two identical sections of a predetermined length so as to form the sections of a final shape, the bar having a pair of side surfaces extending at an angle of between 164° and 172° to the planar face, each of said sections having at least one bore which is offset from and parallel to the groove through each bar section, said two rolled and cut sections together with the faces abutting flatly and the semi-cylindrical grooves forming a cylindrical passage.

8. The split-flange connector as defined in claim 7, wherein each of said sections has lateral formations, said securing means including a clip each having one leg engaged over the formation of one of the bar sections and another leg engaged over the formation of the other section, and extending across the plane of the faces of the sections.

9. The split-flange connector as defined in claim 8, wherein the clips are of spring steel and releasably pull the respective formations together.

* * * * *

UNITED STATES PATENT AND TRADEMARK OFFICE
CERTIFICATE OF CORRECTION

PATENT NO. : 4,776,193

DATED : October 11, 1988

INVENTOR(S) : Joachim Horn

It is certified that error appears in the above-identified patent and that said Letters Patent is hereby corrected as shown below:

On the title page, Item [63], line 3, "523,306" should read --522,306--

Signed and Sealed this

Seventeenth Day of October, 1989

Attest:

DONALD J. QUIGG

Attesting Officer

Commissioner of Patents and Trademarks